United States Patent [19]

Readal et al.

[11] 4,036,740
[45] July 19, 1977

[54] HYDROCARBON CATALYTIC CRACKING PROCESS

[75] Inventors: Thomas C. Readal; Joel D. McKinney; Robert A. Titmus, all of Pittsburgh, Pa.

[73] Assignee: Gulf Research & Development Company, Pittsburgh, Pa.

[21] Appl. No.: 625,836

[22] Filed: Oct. 28, 1975

[51] Int. Cl.² .......................... C10G 11/04; B01J 8/24
[52] U.S. Cl. .................................. 208/120; 208/113; 252/416; 252/419
[58] Field of Search ............................ 208/120, 113; 252/416–417

[56] References Cited

U.S. PATENT DOCUMENTS

| 2,129,693 | 9/1938 | Houdry | 252/417 |
| 2,436,927 | 3/1948 | Kassel | 252/417 |
| 3,711,422 | 1/1973 | Johnson et al. | 252/414 |
| 3,909,392 | 9/1975 | Horecky et al. | 208/120 |

Primary Examiner—Delbert E. Gantz
Assistant Examiner—G. E. Schmitkons

[57] ABSTRACT

An improved hydrocarbon catalytic cracking process which comprises determining the concentrations of carbon dioxide and carbon monoxide in the gaseous effluent from the catalyst regeneration zone and adjusting the rate of addition of a selective treating agent to the hydrocarbon feed to the cracking zone so as to maintain a volume ratio of carbon dioxide to carbon monoxide of at least 2.2 in said effluent.

7 Claims, No Drawings

HYDROCARBON CATALYTIC CRACKING PROCESS

BACKGROUND OF THE INVENTION

Catalytic cracking processes are conventionally employed to produce gasoline and light distillate fractions from heavier hydrocarbon feed stocks. These cracking processes include fixed bed operations and fluid catalytic riser cracking processes. The catalysts employed in such conventional processes for the cracking of hydrocarbons boiling substantially above 600° F. generally contain silica or silica-alumina, such materials frequently being associated with zeolitic materials. These zeolitic materials can be natural occurring or could have been produced by conventional ion exchange methods so as to provide metallic ions which improve the catalyst activity of the molecular sieve zeolitic-modified silica-alumina catalysts.

Examples of cracking catalysts to which the method of this invention is applicable include those obtained by admixing an inorganic oxide gel with an aluminosilicate and aluminosilicate compositions which are strongly acidic in character as a result of treatment with a fluid medium containing at least one rare earth metal cation and a hydrogen ion or one capable of conversion to a hydrogen ion. Other cracking catalyst compositions which can be employed in conventional processes and the process of this invention include those crystalline aluminosilicate zeolites having a mordenite crystal structure.

As an integral step of the hydrocarbon cracking process, the cracking catalyst is regenerated by heating the catalyst to elevated temperatures generally in the range of about 800° to about 1600° F. (427° to 871° C.) for a period of time ranging from 3 to 30 minutes, in the presence of a free oxygen-containing gas. This process step in a separate regenerator is conducted so as to reduce the concentration of the carbon on the catalyst to less than 0.3 weight percent.

Conventional operation of the regeneration step results in the production of carbon dioxide and carbon monoxide which are withdrawn from the regenerator in the effluent gaseous stream. Normally, the ratio of carbon dioxide to carbon monoxide on a volume basis is less than 2.0. If the volume ratio of carbon dioxide to carbon monoxide at a constant excess oxygen and substantially constant regenerator bed temperature could be increased in the regeneration zone, there would result an increase in the heat of combustion from the coke. This increased heat of combustion would increase bed temperature at constant coke make and would result in desirable reduced levels of carbon on regenerated catalyst and improved gasoline and light distillate product yields of the cracking process.

A greater heat release in the regeneration zone from the more complete conversion of the carbon monoxide to carbon dioxide can be an aid in heat balancing the process of cracking low boiling feeds, hydrogenated feeds and paraffinic charge stocks. Such feed stocks have low aromatic carbon contents ($C_A$) as defined by the following classification method:

$$C_A = 0.2514 + 0.00065 \, Tw + 0.0086 \, S - 0.00605 \times AnPt + 0 \, 0.00257 \, AnPt/Sp.Gr.$$

where

Tw = Weight average boiling point (° F.)

AnPt = Aniline Point, ASTM D-611, (° F.)

S = Weight percent sulfur

Sp.Gr. = Specific gravity (60/60° F.)

When the $C_A$ value is lower than 12 volume percent the coke yield may not be sufficient to provide the heat required to satisfy the reactor heat duty at normal carbon monoxide to carbon dioxide ratio levels.

SUMMARY OF THE INVENTION

In the catalytic cracking of hydrocarbon feed stocks and the regeneration of the catalyst containing at least 1500 parts per million nickel equivalent metal contaminants recovered from the catalytic cracking zone, a process which comprises measuring the concentration of carbon dioxide and carbon oxide in the gaseous effluent withdrawn from the catalyst regeneration zone and adjusting the rate of addition of a selective treating agent to the hydrocarbon feed passed to the cracking zone so as to maintain a volume ratio of carbon dioxide to carbon monoxide of at least 2.2 in said gaseous effluent. The catalyst is heated in a single regeneration step to a temperature in the range of about 800° to about 1600° F. (427° to 871° C.), preferably about 1160° to 1260° F. (627° to 682° C.) in the presence of a free-oxygen containing gas so as to reduce the concentration on the carbon on the catalyst to less than 0.3 percent.

DESCRIPTION OF PREFERRED EMBODIMENTS

The cracking catalyst compositions treated by the process of the invention are those which have been deactivated, at least in part, by the deposition thereon of carbon and metal contaminants such as nickel and vanadium to the extent that optimum product yields are no longer obtained. The method of this invention is directed to the regeneration of cracking catalyst compositions containing at least 1500 parts per million nickel equivalent (nickel plus 0.2 vanadium) metal contaminants. The method of this invention particularly applicable to cracking catalyst containing at least 2500 parts per million nickel equivalent metal contaminants.

Although not to be limited thereto, a preferred method of conducting the catalytic cracking process is by fluid catalytic cracking using riser outlet temperatures between about 900° to 1100° F. (482° to 593° C.). The invention will hereafter be described as it relates to a fluid catalytic cracking process although those skilled in the art will readily recognize that the invention is equally applicable to those catalytic cracking processes employing a fixed catalyst bed.

Under fluid catalytic cracking conditions the cracking occurs in the presence of a fluidized composited catalyst in an elongated reactor tube commonly referred to as a riser. Generally, the riser has a length to diameter ratio of about 20. The charge stock is passed through a preheater which heats the feed to a temperature of about 600° F. (316° C.) and the heated feed is then charged into the bottom of the riser.

In operation, a contact time (based on feed) of up to 15 seconds and catalyst to oil weight ratios of about 4:1 to about 15:1 are employed. Steam can be introduced into the oil inlet line to the riser and/or introduced independently to the bottom of the riser so as to assist in carrying regenerated catalyst upwardly through the riser. Regenerated catalyst at temperatures generally between about 1100° and 1350° F. (593° to 732° C.) is introduced into the bottom of the riser.

The riser system at a pressure in the range of about 5 to about 50 psig (.35 to 3.50 Kg/cm$^2$) is normally operated with catalyst and hydrocarbon feed flowing concurrently into and upwardly into the riser at about the same flow velocity, thereby avoiding any significant slippage of catalyst relative to hydrocarbon in the riser and avoiding formation of a catalyst bed in the reaction flow stream. In this manner the catalyst to oil ratio thus increases significantly from the riser inlet along the reaction flow stream.

The riser temperature drops along the riser length due to heating and vaporization of the feed, by the slightly endothermic nature of the cracking reaction and heat loss to the atmosphere. As nearly all the cracking occurs within one or two seconds, it is necessary that feed vaporization occurs nearly instantaneously upon contact of feed and regenerated catalyst at the bottom of the riser. Therefore, at the riser inlet, the hot, regenerated catalyst and preheated feed, generally together with a mixing agent such as steam, (as heretofore described) nitrogen, methane, ethane or other light gas, are intimately admixed to achieve an equilibrium temperature nearly instantaneously.

The catalyst containing at least 1500 parts per million nickel equivalent and carbon in excess of 0.3 weight percent is separated from the hydrocarbon product effluent withdrawn from the reactor and passed to a regenerator. In the regenerator the catalyst is heated to a temperature in the range of about 800° to about 1600° F. (427° to 871° C.), preferably 1160° to 1260° F. (627° to 682° C.), for a period of time ranging from three to thirty minutes in the presence of a free-oxygen containing gas. This burning step is conducted so as to reduce the concentration of the carbon on the catalyst to less than 0.3 weight percent by conversion of the carbon to carbon monoxide and carbon dioxide.

The carbon dioxide and carbon monoxide produced in the regeneration step are withdrawn from the regenerator with the effluent gaseous stream. The concentration of the carbon dioxide and carbon monoxide in the effluent gaseous stream is measured and the addition of a selected treating agent to the hydrocarbon feed to the cracking zone adjusted responsive thereto in the hereafter described manner.

In the practice of the invention, the volume ratio of carbon dioxide to carbon monoxide in the gaseous effluent withdrawn from the regeneration zone employing a single burning step is maintained at 2.2 or higher. Normally, the volume ratio is maintained in the range of 2.2 to 5.0. As indicated in the previous paragraph, the controlled ratio of carbon dioxide to carbon monoxide is maintained by the addition of a selective treating agent to the hydrocarbon feed passed to the cracking zone. The treating agent employed is selected from the compounds of antimony, bismuth and/or manganese. Such compounds are either the oxides or those compounds which are convertible to the oxide upon subjecting the catalyst composition containing the selected treating agent to regeneration. Suitable treating agents employed are triphenylbismuthine, manganese naphthenate, bismuth nitrate, bismuth trichloride, manganese nitrate, manganese benzoate, antimony lactate, antimony acetate, antimony trioxide, and antimony trichloride.

Although as previously indicated, the amount of treating agent which is added to the hydrocarbon feed and thus applied to the catalyst is adjusted responsive to the volume ratio of carbon dioxide to carbon monoxide in the regeneration zone effluent, the treating agent is generally applied to the catalyst in an amount less than about 2 mols per mol of metal contaminants on the catalyst. Normally, the amount of treating agent added to the hydrocarbon feed to the catalytic cracking zone will range from about 3 parts per million (ppm) to 3000 ppm, preferably from 100 to 500 ppm, based upon the hydrocarbon feed to the cracking zone.

The treating agent can be added to the hydrocarbon feed directly or by employing suitable carrying agents. For example, the treating agent can be dissolved and dispersed in a hydrocarbon solvent such as benzene and the solvent added to the charge stock to the cracking process.

It will be appreciated by those skilled in the art that the rate of addition of the selective treating agent to the hydrocarbon feed passed to the cracking zone will be increased should the volume ratio of carbon dioxide to carbon monoxide in the reaction zone gaseous effluent fall below 2.2. Although not to be limited thereto, should the volume ratio of carbon dioxide to carbon monoxide increase to above 5.0, it may be desirable to reduce the rate of flow of selective treating agent to the cracking zone so as to maintain the volume ratio in the preferred range of 2.2 to 5.0.

The charge stocks employed in the catalytic cracking process of this invention are those conventionally utilized in catalytic cracking processes to produce gasoline and light distillate fractions from heavier hydrocarbon feedstocks and generally are those feedstocks having an average boiling temperature above 600° F. (316° C.) and include such materials as gas oils, cycle oils, residuums and the like. The cracking processes to which this invention are applicable are those generally conducted at temperatures between 800° and about 1200° F. (427° and 649° C.) and at pressures within the range of subatmospheric to 3000 psig (210 Kg/cm$^2$).

The following examples are presented to illustrate preferred embodiments of the invention, but the invention is not to be considered limited to the specific embodiments presented therein.

EXAMPLE I

The cracking catalyst composition employed in the fluid catalytic cracking process (FCC) of this example and succeeding examples was a crystalline aluminosilicate dispersed in a refractory oxide matrix. Other physical characteristics of the catalyst composition as employed included a surface area of 99.6 square meters per gram and a pore volume of 0.18 cc per gram. Chemical analysis of the catalyst composition was as follows:

|  | Weight % |
|---|---|
| Nickel | 0.250 |
| Vanadium | 0.040 |
| Alumina | 42.53 |
| Sodium | 0.51 |
| Cerium | 0.36 |
| Lanthanum | 1.11 |

The gas oil feed to the FCC process of the run of this example was characterized as follows:

| | |
|---|---|
| Gravity, °API | 25.0 |
| Sulfur, wt. % | 0.31 |
| Nitrogen, wt. % | 0.12 |
| Carbon Residue, Rams, ASTM D525, wt. % | 0.77 |
| Aniline Point, ASTM | |

-continued

| | | |
|---|---|---|
| D611, °F. | 199 | (93° C) |
| Viscosity, SUS, ASTM D2161, 210° F. (99° C) | 49.8 | |
| Pour Point, ASTM D97, °F. | +90 | (+32° C) |
| Nickel, ppm | 1.2 | |
| Vanadium, ppm | 0.4 | |
| Vacuum Distillation ASTM D1160 °F. | | |
| 10% at 760 mm | 622 | (328° C) |
| 30% | 716 | (380° C) |
| 50% | 797 | (425° C) |
| 70% | 885 | (474° C) |
| 90% | 1055 | (568° C) |

The gas oil feed containing 1.2 ppm nickel and 0.4 ppm vanadium and the above-described catalyst composition containing 2580 ppm nickel equivalents as metal contaminants was charged continuously to a riser reactor operated at the following conditions:

| | | |
|---|---|---|
| Hydrocarbon Feed Preheat Temp.: °F. | 521 | (272° C) |
| Catalyst Preheat Temp.: °F. | 1210 | (654° C) |
| Catalyst to Oil Ratio: wt. of catalyst/wt. Fresh Feed | 8.9 | |
| Reaction Zone Average Temp.: °F. | 1001 | (538° C) |
| Riser Outlet Temp.: °F. | 980 | (527° C) |
| Contact Time, based on Feed: SEC. | 8.52 | |
| Carbon on Regenerated Catalyst: wt. % | 0.3 | |
| Hydrocarbon Recycle Rate: wt. % of FF | 7.1 | |
| Riser Pressure: PSIG | 25.1 | |

The products obtained during this run were as follows:

| Product Yields: Vol % of FF | |
|---|---|
| Slurry Oil [650 + F (343 + C) TBP] | 5.0 |
| Furnace Oil [650F (343C) TBP] | 18.0 |
| Debut. Gaso. [430F (221C) TBP EP] | 57.8 |
| Depent. Gaso. [430F (221C) TBP EP] | 48.4 |
| Heavy Gaso. [430F (221C) TBP EP] | 24.6 |
| Depentanized Light Gasoline | 23.8 |
| Light Hydrocarbons: | |
| Total Pentanes-Pentenes | 9.4 |
| I-Pentane | 2.8 |
| N-Pentane | 0.4 |
| Pentenes | 6.2 |
| Total Butanes-Butenes | 13.8 |
| I-Butane | 3.4 |
| N-Butane | 0.8 |
| Butenes | 9.6 |
| Total Propane-Propylene | 10.2 |
| Propane | 1.6 |
| Propylene | 8.6 |
| Total $C_3+$ Liquid Yield: Vol & FF | 104.8 |
| Conv. To 430F (221C) EP Gaso. And Lighter | |
| WT % Of FF | 76.0 |
| VOL % Of FF | 77.0 |
| Product Yields: wt % Of FF | |
| $C_2$ And Lighter | 3.5 |
| Total Ethane-Ethylene | 1.6 |
| Ethane | 0.8 |
| Ethylene | 0.8 |
| Methane | 1.1 |
| Hydrogen | 0.66 |
| Hydrogen Sulfide | 0.1 |
| Coke By Flue Gas Analysis | 9.1 |

During the run, the catalyst was continuously regenerated in a single burning step employing the following operating conditions:

| | | |
|---|---|---|
| Regenerator Temp.: °F. | 1217 | (658° C) |
| Air Rate: SCF/HR | 31.5 | |
| Flue Gas Rate: SCF/HR | 51.2 | |

Analysis of the flue gas produced the following results:

| | |
|---|---|
| Nitrogen | 86.8 |
| Oxygen | 0.9 |
| Carbon Dioxide | 8.0 |
| Carbon Monoxide | 4.3 |
| $CO_2$ / CO Vol Ratio | 1.9 |

The heat of combustion of the carbon on the catalyst was 10,606 BTU per pound.

EXAMPLE II

The run of Example I was repeated with the exception that antimony was added to the catalyst until the catalyst contained 1 mol of antimony per mol of nickel equivalent metal contaminants on the catalyst. The gas oil feed of Example I was continuously charged with the catalyst composition to a riser reactor operated at the following conditions:

| | | |
|---|---|---|
| Hydrocarbon Feed Preheat Temp.: °F. | 516 | (269° C) |
| Catalyst Preheat Temp.: °F. | 1202 | (650° C) |
| Catalyst to Oil Ratio: wt. of catalyst/wt. Fresh Feed | 8.5 | |
| Reaction Zone Average Temp.: °F. | 999 | (537° C) |
| Riser Outlet Temp.: °F. | 981 | (527° C) |
| Contact Time, based on Feed: SEC. | 8.66 | |
| Carbon on Regenerated Catalyst: wt. % | 0.3 | |
| Hydrocarbon Recycle Rate: wt. % of FF | 6.6 | |
| Riser Pressure: PSIG | 25.1 | |

The products obtained during this run were as follows:

| Product Yields: Vol % Of FF | |
|---|---|
| Slurry Oil [650 + F (343 + C) TBP] | 3.8 |
| Furnace Oil [650F (343C) TBP] | 16.0 |
| Debut. Gaso. [430F (221C) TBP EP] | 61.9 |
| Depent. Gaso. [430F (221C) TBP EP] | 50.2 |
| Heavy Gaso. [430F (221C) TBP EP] | 25.7 |
| Depentanized Light Gasoline | 24.5 |
| Light Hydrocarbons: | |
| Total Pentanes-Pentenes | 11.7 |
| I-Pentane | 4.5 |
| N-Pentane | 0.6 |
| Pentenes | 6.5 |
| Total Butanes-Butenes | 16.6 |
| I-Butane | 5.3 |
| N-Butane | 1.2 |
| Butenes | 10.1 |
| Total Propane-Propylene | 11.5 |
| Propane | 2.0 |
| Propylene | 9.5 |
| Total $C_3+$ Liquid Yield: Vol % FF | 109.8 |
| Conv. To 430F (221C) EP Gaso. And Lighter | |
| WT % Of FF | 79.0 |
| VOL % Of FF | 80.2 |
| Product Yields: wt % Of FF | |
| $C_2$ And Lighter | 2.8 |
| Total Ethane-Ethylene | 1.4 |
| Ethane | 0.7 |
| Ethylene | 0.7 |
| Methane | 1.1 |
| Hydrogen | 0.15 |
| Hydrogen Sulfide | 0.1 |
| Coke By Flue Gas Analysis | 7.6 |

During the run, the catalyst was continuously regenerated in a single burning step employing the following operating conditions:

| | | |
|---|---|---|
| Regenerator Temp.: ° F. | 1198 | (648° C) |
| Air Rate: SCF/HR | 37.5 | |
| Flue Gas Rate: SCF/HR | 49.6 | |

Analysis of the flue gas produced the following results:

| | | |
|---|---|---|
| Nitrogen | | 88.3 |
| Oxygen | | 1.1 |
| Carbon Dioxide | | 8.9 |
| Carbon Monoxide | | 1.7 |
| $CO_2$ / CO Vol Ratio | | 5.1 |

The heat of combustion of the carbon on the catalyst was 12,458 BTU per pound.

A comparison of the results obtained in this example and Example I demonstrates the effectiveness of the invention to substantially increase the $CO_2$ to CO volume ratio in the regenerator gas effluent and to increase the heat of combustion. The $CO_2$ / CO volume ratio was raised from 1.9 to 5.1 and the heat of combustion was raised from 10,606 to 12,458 BTU's per pound.

EXAMPLE III

In this example, the effectiveness of the addition of antimony to the catalyst to improve FCC catalyst regeneration as applied to a different gas oil feed stock. The gas oil feed was characterized as follows:

| | | |
|---|---|---|
| Gravity, °API | 22.4 | |
| Sulfur, wt. % | 0.26 | |
| Nitrogen, wt. % | 0.32 | |
| Carbon Residue, Rams, ASTM D525, wt. % | 4.39 | |
| Aniline Point, ASTM D611, ° F. | 218 | (103° C) |
| Viscosity, SUS, ASTM D2161, 210° F. (99° C) | 138.1 | |
| Pour Point, ASTM D97, ° F. | +95 | (+35° C) |
| Nickel, ppm | 23.3 | |
| Vanadium, ppm | 3.5 | |
| Vacuum Distillation ASTM D1160 ° F. | | |
| 10% at 760 mm | 716 | (380° C) |
| 30% | 843 | (451° C) |
| 50% | 953 | (512° C) |
| 70% | Cracked | |

The above-characterized gas oil and the catalyst composition of Example I containing 6200 ppm antimony with 2640 ppm nickel and 450 ppm vanadium as metal contaminants was charged continuously to a riser reactor. Other riser reactor operating conditions were as follows:

| | | |
|---|---|---|
| Hydrocarbon Feed Preheat Temp.: ° F. | 525 | (274° C) |
| Catalyst Preheat Temp.: ° F. | 1206 | (652° C) |
| Catalyst to Oil Ratio: wt. of catalyst/wt. Fresh Feed | 8.7 | |
| Reaction Zone Average Temp.: ° F. | 1000 | (538° C) |
| Riser Outlet Temp.: ° F. | 979 | (526° C) |
| Contact Time, based on Feed: SEC. | 9.09 | |
| Carbon on Regenerated Catalyst: wt. % | 0.3 | |
| Hydrocarbon Recycle Rate: Wt. % of FF | 6.8 | |
| Riser Pressure: PSIG | 25.1 | |

The products obtained during this run were as follows:

| | |
|---|---|
| Product Yields: Vol % Of FF | |
| Slurry Oil [650 + F (343 + C) TBP] | 7.7 |
| Furnace Oil [650F (343C) TBP] | 15.2 |
| Debut. Gaso. [430F (221C) TBP EP] | 58.4 |
| Depent. Gaso. [430F (221C) TBP EP] | 49.0 |
| Heavy Gaso. [430F (221C) TBP EP] | 26.1 |
| Depentanized Light Gasoline | 22.9 |
| Light Hydrocarbons: | |
| Total Pentanes-Pentenes | 9.3 |
| I-Pentane | 2.5 |
| N-Pentane | 0.5 |
| Pentenes | 6.3 |
| Total Butanes-Butenes | 14.3 |
| I-Butane | 3.7 |
| N-Butane | 0.9 |
| Butenes | 9.7 |
| Total Propane-Propylene | 11.1 |
| Propane | 2.0 |
| Propylene | 9.0 |
| Total $C_3+$ Liquid Yield: Vol % FF | 106.6 |
| Conv. To 430F (221C) EP Gaso. And Lighter | |
| WT % Of FF | 76.7 |
| VOL % Of FF | 77.1 |
| Product Yields: Wt % Of FF | |
| $C_2$ And Lighter | 3.8 |
| Total Ethane-Ethylene | 2.2 |
| Ethane | 1.2 |
| Ethylene | 1.0 |
| Methane | 1.3 |
| Hydrogen | 0.17 |
| Hydrogen Sulfide | 0.1 |
| Coke By Flue Gas Analysis | 9.9 |

During the run, the catalyst was continuously regenerated in a single burning step employing the following operating conditions:

| | | |
|---|---|---|
| Regenerator Temp.: ° F. | 1236 | (669° C) |
| Air Rate: SCF/HR | 40.6 | |
| Flue Gas Rate: SCF/HR | 55.8 | |

Analysis of the flue gas produced the following results:

| | |
|---|---|
| Nitrogen | 86.9 |
| Oxygen | 1.0 |
| Carbon Dioxide | 9.0 |
| Carbon Monoxide | 3.1 |
| $CO_2$ / CO Vol Ratio | 2.9 |

EXAMPLE IV

In this example, the effect of bismuth in the FCC catalyst regeneration process is demonstrated. The cracking catalyst composition employed in each of the runs of this example was a crystalline aluminosilicate dispersed in a refractory oxide matrix. The catalyst had a surface area of 131 square meters per gram, a pore volume of 0.28 cc per gram, and apparent bulk density of 0.68 grams per cc. Chemical analysis of the catalyst showed the composition to be as follows:

| | Weight % |
|---|---|
| Iron | 0.358 |
| Nickel | 0.295 |
| Vanadium | 0.075 |
| Sodium | 0.49 |
| Alumina | 44.23 |
| Cerium | 0.30 |

The gas oil feed to each run of this example was characterized as follows:

| | |
|---|---|
| Gravity, °API | 25.0 |
| Sulfur, wt. % | 0.31 |

| | -continued | |
|---|---|---|
| Nitrogen, wt. % | 0.12 | |
| Carbon Residue, Rams ASTM D525, wt. % | 0.77 | |
| Aniline Point, ASTM D611, °F. | 199 | (93° C) |
| Viscosity, SUS, ASTM D2161, 210° F. (99° C) | 49.8 | |
| Pour Point, ASTM D97, °F. | +90 | (+32° C) |
| Nickel, ppm | 1.2 | |
| Vanadium, ppm | 0.4 | |
| Vacuum Distillation ASTM D1160 °F. | | |
| 10% at 760 mm | 622 | (328° C) |
| 30% | 716 | (380° C) |
| 50% | 797 | (425° C) |
| 70% | 885 | (474° C) |
| | 1055 | (568° C) |

Run No. 1 was conducted without the addition of bismuth to the catalyst and serves as a basis of comparison for Run 2 which was conducted with the addition of a selective treating agent to the catalyst. In Run No. 2, bismuth was added to the catalyst by the injection of triphenylbismuthine in the gas oil charge to the FCC process for a period of eight hours and until the catalyst contained 6,050 ppm bismuth.

In each run, the gas oil feed was charged continuously to a riser reactor operated at the following conditions:

| | Run No. 1 | | Run No. 2 | |
|---|---|---|---|---|
| Hydrocarbon Feed Preheat Temp.: °F. | 516 | (269° C) | 520 | (271° C) |
| Catalyst Preheat Temp.: °F. | 1197 | (647° C) | 1201 | (649° C) |
| Catalyst to Oil Ratio: wt. of catalyst/wt. Fresh Feed | 9.4 | | 9.2 | |
| Reaction Zone Average Temp.: °F. | 988 | (531° C) | 990 | (532° C) |
| Riser Outlet Temp.: °F. | 979 | (526° C) | 980 | (527° C) |
| Contact Time, based on Feed: SEC. | 8.72 | | 8.78 | |
| Carbon on Regenerated Catalyst: wt. % | 0.3 | | 0.3 | |
| Hydrocarbon Recycle Rate: wt. % of FF | 9.4 | | 8.9 | |
| Riser Pressure: PSIG | 25.8 | (2kg/cm²) | 26.3 | (2kg/cm²) |

The product yields, based upon volume percent of fresh feed, during each of the runs were as follows:

| | Run No. 1 | Run No. 2 |
|---|---|---|
| Slurry Oil [650 + °F. (343 + °C) TBP] | 2.3 | 2.1 |
| Furnace Oil [650 °F. (343° C) TBP EP] | 12.1 | 12.2 |
| Debut. Gaso. [430 °F. (221° C) TBP EP] | 61.7 | 62.9 |
| Depent. Gaso. [430 °F. (221° C) TBP EP] | 48.5 | 49.1 |
| Heavy Gasoline [430 °F. (221° C) TBP EP] | 27.1 | 26.6 |
| Depentanized Light Gasoline | 21.4 | 22.5 |
| Total Pentanes- | | |
| Pentenes | 13.2 | 13.8 |
| I-Pentane | 6.7 | 7.3 |
| N-Pentane | 0.9 | 0.9 |
| Pentenes | 5.6 | 5.6 |
| Total Butanes-Butenes | 19.6 | 19.7 |
| I-Butane | 7.0 | 7.3 |
| N-Butane | 1.7 | 1.8 |
| Butenes | 10.9 | 10.6 |
| Total Propane- | | |
| Propylene | 11.8 | 11.7 |
| Propane | 2.4 | 2.3 |
| Propylene | 9.4 | 9.4 |
| Total C₃+ Liquid Yield | 107.5 | 108.6 |

During each run, the catalyst was continuously regenerated in a single burning step employing the following operating conditions:

| Regenerator Temp.: °F. | 1258 | (681° C) | 1251 | (677° C) |
|---|---|---|---|---|
| Air Rate: SCF/HR | 40.0 | (1133L/HR) | 40.1 | (1134L/HR) |
| Flue Gas Rate: SCF/HR | 56.2 | (1592L/HR) | 55.6 | (1575L/HR) |

Analysis of the flue gas produced in each of the runs gave the following results.

| | Run No. 1 | Run No. 2 |
|---|---|---|
| Flue Gas Analysis, Mol % | | |
| Nitrogen | 85.6 | 85.8 |
| Oxygen | 1.5 | 1.5 |
| Carbon Dioxide | 8.7 | 9.6 |
| Carbon Monoxide | 4.2 | 3.1 |
| Hydrogen | 0.0 | 0.0 |
| Sulfur Dioxide | 0.0 | 0.0 |
| Hydrogen Sulfide | 0.0 | 0.0 |
| Water | 0.0 | 0.0 |
| $CO_2$ / CO Vol Ratio | 2.1 | 3.1 |

A comparison of Runs 1 and 2 demonstrates the effectiveness of the invention to increase the volume ratio of $CO_2$ / CO by the addition of bismuth to the feed to the FCC catalytic cracking zone.

Although the invention has been described with reference to specific embodiments, references, and details, various modifications and changes will be apparent to one skilled in the art and are contemplated to be embraced in this invention.

We claim:

1. In a process which comprises contacting a hydrocarbon feed with a cracking catalyst in a cracking zone under cracking conditions to produce a lower boiling gasoline fraction and thereafter heating the deactivated catalyst in the presence of oxygen in a regeneration zone to a temperature in the range of 800° to 1600° F. until the concentration of carbon on the catalyst is less than 0.3 weight percent; the improvement which comprises conducting the cracking process until the concentration of metal contaminants on the catalyst is at least 1500 ppm nickel equivalents, determining the carbon dioxide and carbon monoxide concentrations in the gaseous effluent withdrawn from said regeneration zone, and adjusting the rate of flow in said hydrocarbon feed to said cracking zone of a treating agent selected from the group consisting of antimony, bismuth, manganese and compounds of such treating agents convertible to the oxide form so as to maintain a volume ratio of carbon dioxide to carbon monoxide in said gaseous effluent of at least 2.2.

2. The process of claim 1 wherein the cracking process is conducted until the concentration of metal contaminants as nickel equivalents is at least 2500 ppm on said catalyst.

3. The process of claim 1 wherein the volume ratio of carbon dioxide to carbon monoxide maintained in said regeneration zone effluent is in the range of 2.2 to 5.0.

4. The process of claim 1 wherein the concentration of said treating agent applied to said catalyst in said cracking zone is less than 2 mol per mol of metal contaminants on said catalyst.

5. The process of claim 1 wherein the amount of treating agent added to the hydrocarbon feed to said cracking zone will range from about 3 ppm to 3000 ppm, based upon the hydrocarbon feed to said cracking zone.

6. The process of claim 1 wherein said treating agent is antimony or an antimony compound convertible to antimony oxide.

7. The process of claim 1 wherein said treating agent is bismuth or a bismuth compound convertible to bismuth oxide.

* * * * *